United States Patent
Oetken et al.

(10) Patent No.: US 9,550,522 B2
(45) Date of Patent: Jan. 24, 2017

(54) COMPACTOR TURNING SPEED LIMITER

(71) Applicant: CATERPILLAR PAVING PRODUCTS INC., Brooklyn Park, MN (US)

(72) Inventors: Nicholas Alan Oetken, Brooklyn Park, MN (US); John Lee Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 14/626,390

(22) Filed: Feb. 19, 2015

(65) Prior Publication Data

US 2016/0244091 A1 Aug. 25, 2016

(51) Int. Cl.
| | | |
|---|---|---|
| *E01C 19/23* | (2006.01) | |
| *B62D 6/00* | (2006.01) | |
| *E01C 19/42* | (2006.01) | |

(52) U.S. Cl.
CPC ............ *B62D 6/00* (2013.01); *E01C 19/23* (2013.01); *E01C 19/42* (2013.01); *E01C 2301/00* (2013.01)

(58) Field of Classification Search
USPC .......................... 404/117; 701/41, 42, 43, 69
See application file for complete search history.

(56) References Cited

U.S. PATENT DOCUMENTS

| | | | |
|---|---|---|---|
| 5,562,175 A | 10/1996 | Bjorsne et al. | |
| 5,931,881 A * | 8/1999 | Gustin | B62D 9/00 |
| | | | 180/197 |
| 6,287,048 B1 | 9/2001 | Hollon et al. | |
| 6,397,135 B1 | 5/2002 | Akita | |
| 6,549,835 B2 | 4/2003 | Deguchi et al. | |
| 7,886,864 B2 | 2/2011 | Potts et al. | |
| 8,634,989 B1 * | 1/2014 | Schramm | B62D 5/005 |
| | | | 180/420 |
| 2003/0118401 A1 * | 6/2003 | Magee | E01C 19/286 |
| | | | 404/117 |
| 2006/0034660 A1 * | 2/2006 | Satzler | E01C 19/236 |
| | | | 404/124 |
| 2006/0247852 A1 * | 11/2006 | Kortge | G01C 22/00 |
| | | | 701/533 |

FOREIGN PATENT DOCUMENTS

| | | |
|---|---|---|
| CN | 103675320 A | 3/2014 |
| EP | 1118713 B1 | 10/2004 |

\* cited by examiner

*Primary Examiner* — Thomas Tarcza
*Assistant Examiner* — Richard Goldman
(74) *Attorney, Agent, or Firm* — Miller, Matthias & Hull LLP

(57) ABSTRACT

A system and method for limiting a turning speed of a compactor is disclosed. The compactor includes a steering member configured to receive operator steering input. The system may comprise a speed sensor, and a controller in communication with the speed sensor. The speed sensor may be mounted on the compactor and configured to measure a travel speed of the compactor over a surface. In some embodiments, a temperature sensor, configured to measure a temperature of the surface, may be mounted on the compactor and in communication with the controller. The controller is configured to receive the travel speed and/or temperature, and to limit a turning speed of the compactor when a condition is satisfied.

19 Claims, 6 Drawing Sheets

COMPACTOR TURNING SPEED LIMITER

TECHNICAL FIELD

The present disclosure generally relates to systems for use on compactors to limit turning speed.

BACKGROUND

Compacting machines or compactors are commonly used to compact work materials (such as asphalt, and the like) to a desired density while paving highways, parking lots, and other roadways. The process often requires a plurality of passes over the work material to reach the desired density.

The compactor may move in forward drive over a surface and may move in reverse drive over the same surface. If the recently paved surface is relatively hot or the travel speed of the compactor is relatively slow, aggressive turning of the compactor may cause tearing in the newly laid surface.

U.S. Pat. No. 7,886,864 issued Feb. 15, 2011 discloses a vehicle with a compound steering system that has the ability to reorient both a forward and aft steering axis with respect to a chassis. The compound steering system is controlled in a manner in which one of a forward steering actuator and an aft steering actuator will reach its mechanical limit before the other, when a steering command from an operator input results in an oversteer condition. A system that helps reduce tearing of newly laid surfaces is desirable.

SUMMARY OF THE DISCLOSURE

In accordance with one aspect of the disclosure, a system on a compactor is disclosed. The compactor includes a steering member configured to receive operator steering input. The system may comprise a speed sensor, and a controller in communication with the speed sensor. The speed sensor may be mounted on the compactor and configured to measure a travel speed of the compactor over a surface. The controller may be configured to receive the travel speed of the compactor from the speed sensor, and to limit a turning speed of the compactor when a condition is satisfied. In one embodiment, the condition is satisfied when the travel speed is less than a speed threshold.

In accordance with another aspect of the disclosure, a method of limiting a turning speed of a compactor is disclosed. The compactor may include a steering member, a controller, a speed sensor and a temperature sensor. The steering member is configured to receive operator steering input. The speed sensor is mounted on the compactor and is in communication with the controller. The speed sensor is configured to measure a travel speed of the compactor over a surface. The temperature sensor is mounted on the compactor and is in communication with the controller and is configured to measure a temperature of the surface. The method may comprise receiving, by the controller, the travel speed, and limiting the turning speed of the compactor when a condition is satisfied. In one embodiment, the condition is satisfied when the travel speed is less than a speed threshold.

In accordance with a further aspect of the disclosure, a system on a compactor is disclosed. The compactor includes a steering member configured to receive operator steering input. The system may comprise a speed sensor mounted on the compactor, a temperature sensor mounted on the compactor, a steering speed sensor mounted on the compactor, and a controller in communication with the speed sensor, the temperature sensor and the steering speed sensor. The speed sensor is configured to measure a travel speed of the compactor over a surface. The temperature sensor is configured to measure a temperature of the surface. The steering speed sensor is configured to measure a steering speed of the steering member. The controller is configured to receive the travel speed from the speed sensor and the temperature from the temperature sensor, alert an operator each time the travel speed is less than a speed threshold or the temperature is greater than a temperature threshold, receive the steering speed from the steering speed sensor, and log each incident where the steering speed is greater than a turning threshold for a time period after the alert.

DETAILED DESCRIPTION

Figure 1:
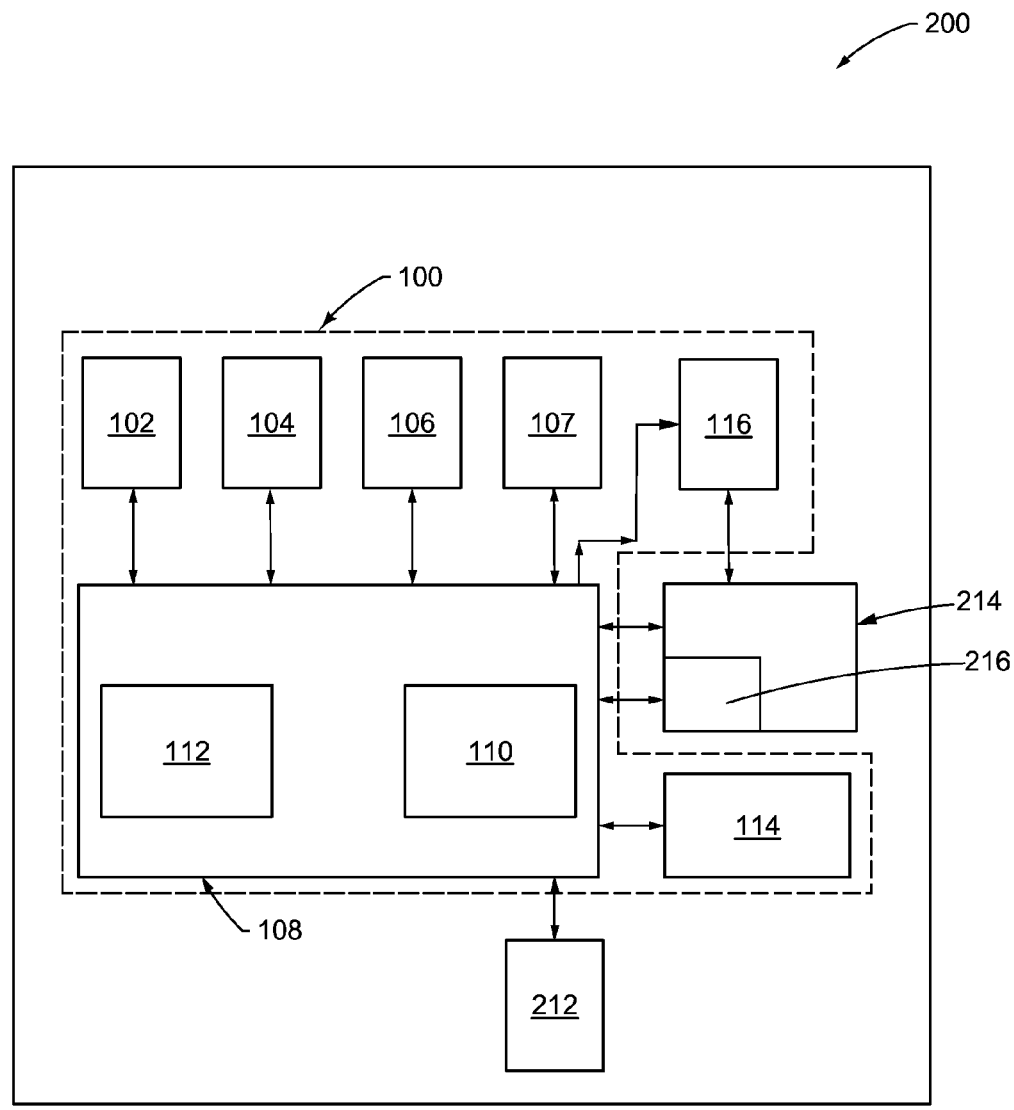
FIG. 1 is a schematic of an exemplary embodiment of a system in accordance with the teachings of this disclosure.

Referring now to the drawings, and with specific reference to FIG. 1, there is shown a schematic of a system 100 in accordance with the present disclosure and generally referred to by reference numeral 100. This disclosure describes exemplary embodiments of the system 100. While the exemplary embodiments of the system 100 are described relative to a compactor 200, the teachings of this disclosure may be employed on other types of compaction devices.

Figure 2:
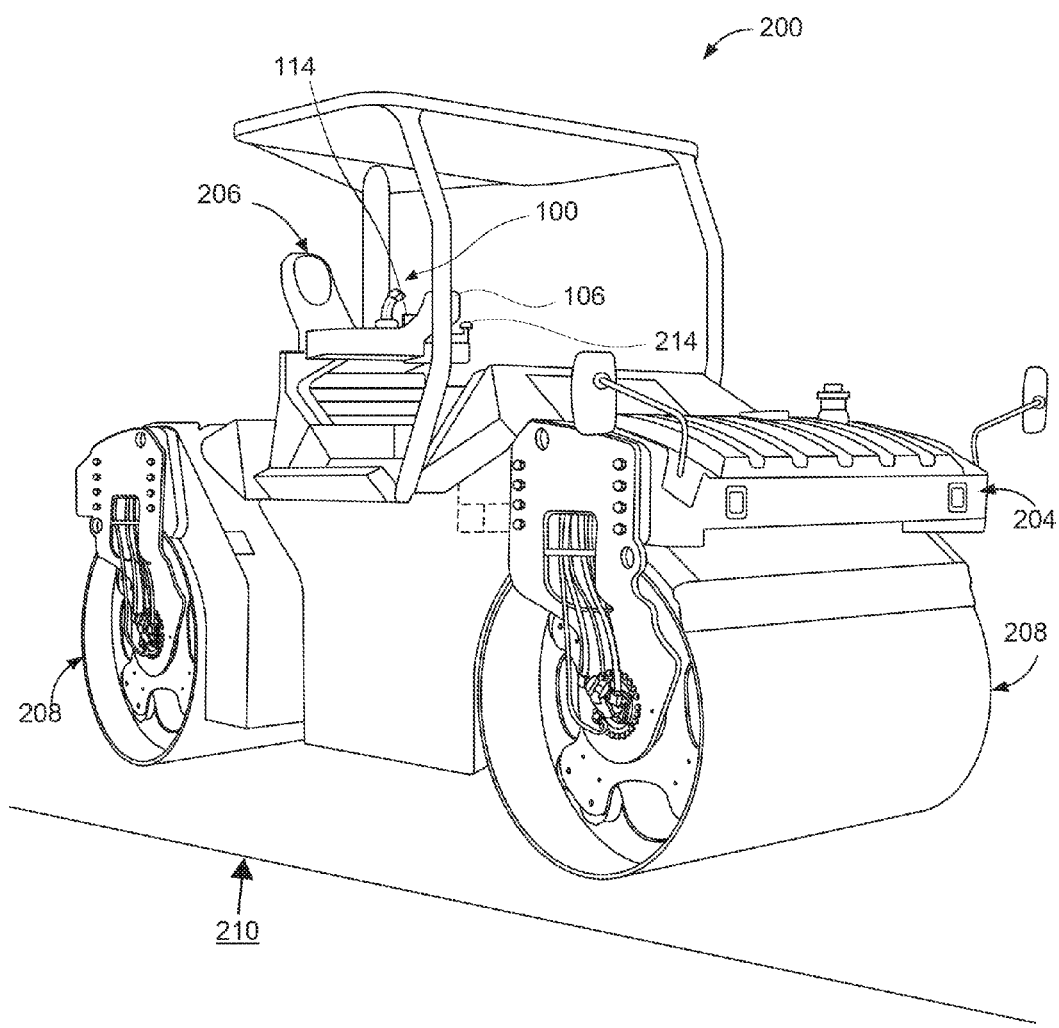
FIG. 2 is a perspective view of an embodiment of an exemplary compactor in which the system of FIG. 1 may be used.

FIG. 2 illustrates an exemplary compactor 200. The compactor 200 includes an engine configured to generate power to physically move the compactor 200, a frame 204, an operator compartment 206, and rollers 208 for compacting a surface 210 (for example, an asphalt mat). The rollers 208 are in rolling contact with the surface 210 and are rotatably mounted to the frame 204. In alternative embodiments, the roller(s) 208 may be replaced with one or more tires. The engine is a part of a drive system (not shown) that propels the compactor 200 by driving the rollers 208. The rollers 208 support the frame 204 above the surface 210 and, when rotated, allow the compactor 200 to travel over the surface 210. The engine may be any type of engine (internal combustion, gas, diesel, gaseous fuel, natural gas, propane, etc.), may be of any size, with any number of cylinders, and in any configuration ("V," in-line, radial, etc.).

The operator compartment 206 may include a steering member 214. The steering member 214 is configured to receive operator steering input. The steering member 214 is in communication with a controller 108. In one embodiment, the steering member 214 may be configured to transmit the operator steering input to the controller 108 for processing. The compactor 200 may travel over the surface 210 in forward drive or reverse drive. The steering member 214 may be a joystick assembly, a wheel assembly, or the like.

The steering member 214 may include a friction device 216 (FIG. 1) in communication with the controller 108 and configured to create resistance to movement by the operator of the steering member 214. Such friction devices 216 are well known in the art. Depending on the friction device 216 utilized, such resistance may be created mechanically, electrically, by use of a variable viscosity fluid, or the like.

The compactor 200 may include a steering control valve 212 in communication with the controller 108. The steering control valve 212 may be configured to receive processed operator steering input from the controller 108 and, based on that processed operator steering input to steer the compactor 200 over the surface 210 by controlling the angular movement of the rollers 208, as is known in the art.

The compactor 200 also includes the system 100 of FIG. 1. As shown in FIG. 1, the system 100 may comprise a speed sensor 102, and the controller 108. In some embodiments, the system may comprise a temperature sensor 104, and the controller 108. In other embodiments the system 100 may comprise a speed sensor 102, a temperature sensor 104 and the controller 108. In any one of the aforementioned embodiments, the system may also include a display 106, an alarm member 107, an operator interface 114, and a steering speed sensor 116.

The speed sensor 102 is mounted on the compactor 200 and is configured to measure a travel speed (the speed of the compactor 200 as it travels over the surface 210). The speed sensor 102 is in communication with the controller 108 and is configured to transmit data to the controller 108 indicative of the measured travel speed.

The temperature sensor 104 may be mounted on the compactor 200 and is configured to measure a temperature of the surface 210 as the compactor 200 travels over the surface 210. The temperature sensor 104 is in communication with the controller 108 and is configured to transmit data to the controller 108 indicative of the measured temperature. The temperature sensor 104 may be an infrared temperature sensor, or any other temperature sensor appropriate for measuring the temperature of the surface 210.

The display 106 may be disposed on the compactor 200. The display 106 is operably connected to the controller 108. The display 106 may be configured to display a warning generated by the controller 108.

The alarm member 107 may be disposed on the compactor 200. The alarm member 107 is operably connected to the controller 108. The alarm member 107 may be configured to produce a vibration, a warning sound, a flashing light, or the like when activated by the controller 108.

The operator interface 114 may be a switch, control pad, or the like in operative communication with the controller 108 and configured to receive commands to activate the method disclosed herein and to select between the alert-only mode and the control mode.

The steering speed sensor 116 may be mounted on the compactor 200 and is configured to measure the steering speed, or rate of movement, of the steering member 214 by the operator. The steering speed sensor 116 is in communication with the controller 108 and is configured to transmit data to the controller 108 indicative of the measured steering speed.

Steering speed is the rate at which the steering member 214 is turned or moved by the operator in order to turn the rollers 208 of the compactor 200. For example, in an embodiment in which the steering member 214 is a steering wheel, the steering speed may be the rate at which the steering wheel may be rotated by the operator. In an embodiment in which the steering member 214 is a joystick, the steering speed may be the rate at which a joystick may be pushed or pulled by the operator to turn the rollers 208 of the compactor 200 as it moves in a forward or backward direction.

The controller 108 may include a processor 110 and a memory component 112. The processor 110 may be a microprocessor or other processor as known in the art.

In one embodiment, the controller 108 may be configured to receive the travel speed of the compactor 200 from the speed sensor 102 and to limit a turning speed of the compactor 200 when a condition is satisfied. The turning speed is the rate at which the compactor 200 is turned (more specifically, the rollers 208 of) as the compactor 200 moves in a forward or backward direction. The condition may be satisfied when the travel speed is less than a speed threshold. The controller 108 may be configured to limit the turning speed by activating a fixed turning speed, a maximum turning speed cap, or a variable turning speed based on the travel speed. In one embodiment, this may be accomplished by the controller 108 processing the operator steering input received from the steering member 214, and then transmitting the processed operator steering input to the steering control valve 212. The processed operator steering input causes the steering control valve 212 to limit the speed of the angular movement of the rollers 208 around the turning axis of the compactor 200. In order to provide feedback to the operator, the controller 108 may also be configured to activate the friction device 216 to increase resistance to movement by the operator of the steering member 214.

A fixed turning speed is a constant value. A maximum turning speed refers to an arrangement in which the turning speed is capped at a maximum rate. In such an arrangement, the turning speed may be less than, or equal to the maximum rate, but is prevented from exceeding the maximum rate by the steering control valve 212.

A variable turning speed that is based on the travel speed refers to an arrangement in which the turning speed is established by the controller 108, via appropriate activation of the steering control valve 212, based on the measured travel speed. The controller 108 may calculate such turning speed or utilize a lookup table (stored in the memory component 112), or the like, to determine the appropriate turning speed for the compactor 200 based on the travel speed of the compactor 200. As such, the turning speed may vary as the travel speed of the compactor 200 varies. This is not to imply that each different travel speed must have a different turning speed. There may be some travel speeds or groups of travel speeds at which the controller 108 determines that the turning speed should be the same. For instance, for travel speeds slower than a certain speed, the turning speed value may be the same.

In another embodiment, the controller 108 may be configured to receive the temperature of the surface 210 from the temperature sensor 104, and to limit the turning speed of the compactor 200 when a condition is satisfied. The condition may be satisfied when the temperature is greater than a temperature threshold. The controller 108 may be configured to limit the turning speed by activating a fixed turning speed, a maximum turning speed cap, or a variable turning speed based on the temperature of the surface 210.

A variable turning speed that is based on the temperature refers to an arrangement in which the turning speed is established by the controller 108, via appropriate activation of the steering control valve 212, based on the measured temperature of the surface 210. The controller 108 may calculate such turning speed or utilize a lookup table, or the like, to determine the appropriate turning speed for the compactor 200 based on the temperature. As such, the turning speed may vary as the temperature of the surface 210 varies. This is not to imply that each different temperature must have a different turning speed. There may be some temperatures or groups of temperatures at which the controller 108 determines that the turning speed should be the same. For instance, for temperatures greater than a certain temperature, the turning speed value may be the same.

In another embodiment, the controller 108 may be configured to receive the travel speed of the compactor 200 from the speed sensor 102 and the temperature of the surface 210 from the temperature sensor 104, and to limit a turning speed of the compactor 200 when a condition is satisfied. The condition may be satisfied when the travel speed is less than a speed threshold and the temperature is greater than a temperature threshold. The controller 108 may be configured to limit the turning speed by activating a fixed turning speed, a maximum turning speed cap, or a variable turning speed based on both the travel speed and the temperature.

The controller 108 may be configured to generate control signals to activate an alert as a warning for the operator. Such control signals may activate the alarm member 107 to cause a light to be emitted (flashing or otherwise), or an audible alarm such as a buzzer, horn, or the like. Alternatively, or in addition to, the controller 108 may generate a warning message and cause such message to be displayed on the display 106. The controller 108 may be further configured to store in the memory component 112 a log of incidents when the measured steering speed of the steering member 214 is greater than a turning threshold.

In some embodiments, the processor 110 may execute instructions and generate control signals for processing data indicative of the measured travel speed and/or temperature to calculate or determine the appropriate fixed, maximum or variable turning speed. The processor 110 may execute instructions and generate control signals for causing the steering control valve 212 to limit the speed of the angular movement of the rollers 208. The processor 110 may also execute instructions and generate control signals for causing the friction device 216 to increase or decrease the resistance provided to the steering member 214. Such processor 110 instructions that are capable of being executed by a computer may be read into or embodied on a computer readable medium, such as the memory component 112 or provided external to the processor 110. In alternative embodiments, hard wired circuitry may be used in place of, or in combination with, software instructions to implement a control method.

The term "computer readable medium" as used herein refers to any non-transitory medium or combination of media that participates in providing instructions to the processor 110 for execution. Such a medium may comprise all computer readable media except for a transitory, propagating signal. Forms of computer-readable media may include any medium from which a computer processor 110 can read.

The controller 108 is not limited to one processor 110 and memory component 112. The controller 108 may be several processors 110 and memory components 112.

Also disclosed is a method of limiting a turning speed of the compactor 200. The method may comprise receiving, by the controller 108, the travel speed, and limiting a turning speed of the compactor 200 when a condition is satisfied, wherein the condition is satisfied when the travel speed is less than a speed threshold. Alternatively, the method may comprise receiving, by the controller 108, the temperature of the surface 210, and limiting a turning speed of the compactor 200 when a condition is satisfied, wherein the condition is satisfied when the temperature is greater than a temperature threshold. Alternatively, the method may comprise receiving, by the controller 108, the travel speed of the compactor 200 and the temperature of the surface 210, and limiting a turning speed of the compactor 200 when a condition is satisfied, wherein the condition is satisfied when the travel speed is less than a speed threshold and/or the temperature is greater than a temperature threshold.

INDUSTRIAL APPLICABILITY

FIGS. 3-6, are exemplary flowcharts illustrating sample blocks which may be followed in various embodiments of a method of limiting the turning speed of the compactor 200.

The operator may activate the method for limiting the turning speed of a compactor 200 by activation of the operator interface 114 (FIG. 1). In some embodiments, the operator may also be able to select an alert-only mode or a control mode via the operator interface 114. In the alert-only mode, the method will provide an alert or warning to the operator but will not limit the turning speed of the compactor 200 or change the resistance of the steering member 214 to movement. In some embodiments of the alert-only mode, the controller 108 may also log in the memory component 112 each time an alert is activated and the steering speed of the steering member 214, for a time period T after the alert, exceeds a turning threshold. In the control mode, the controller 108 will limit the turning speed of the compactor 200 when certain conditions are met, and, in some embodiments, may also provide an alert or warning to the operator as well. In other embodiments, the method for limiting the turning speed of a compactor 200 may be automatically activated (does not require the operator to switch the method on) when the compactor 200 is operational or in drive mode.

Figure 3:
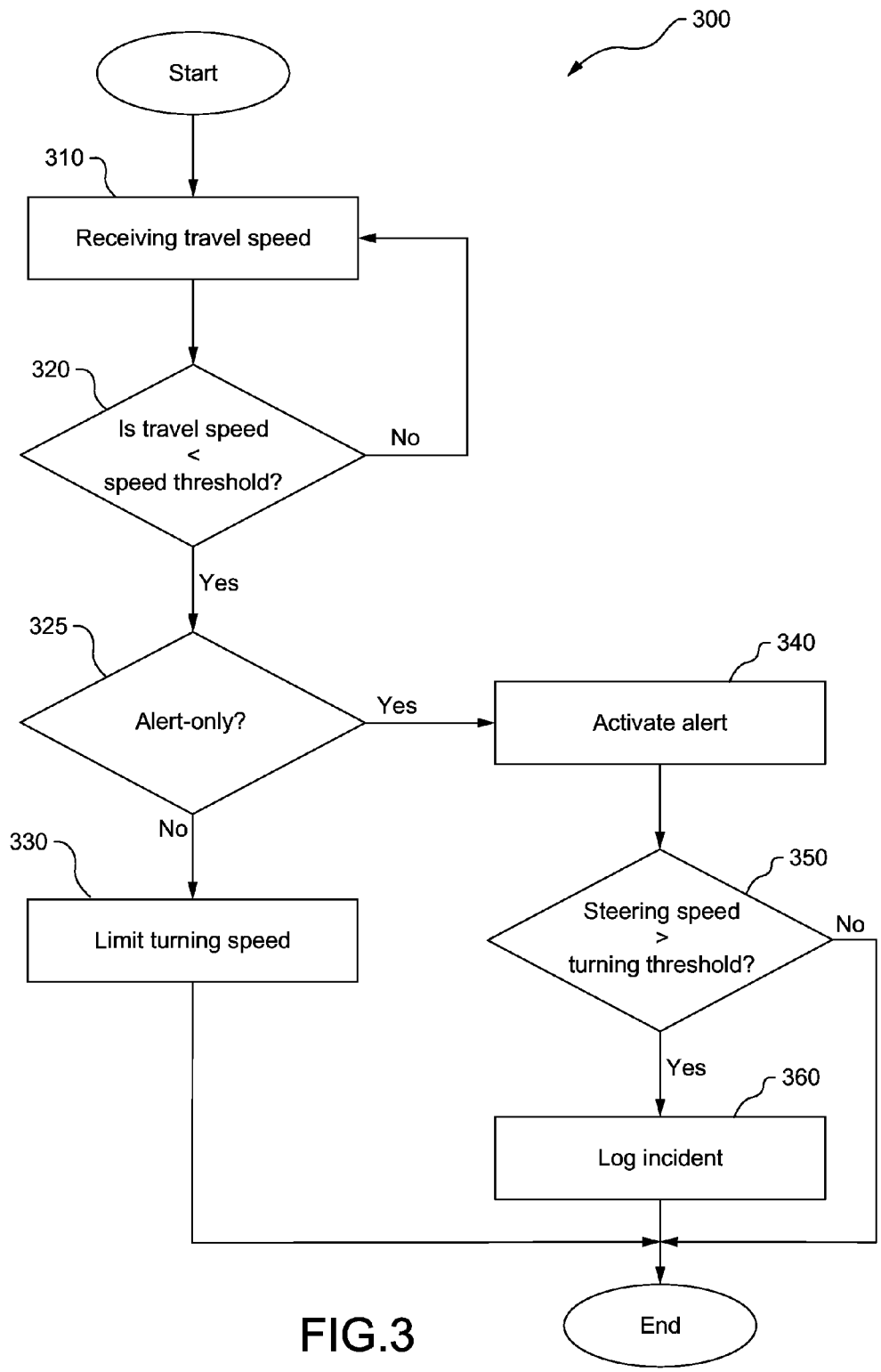
FIG. 3 is a flowchart illustrating exemplary blocks of a method of limiting a turning speed of the compactor.

Referring now to FIG. 3, an exemplary flowchart is illustrated showing sample blocks which may be followed in one embodiment of a method 300 of limiting the turning speed of the compactor 200. The method 300 may be practiced with more or less than the number of blocks shown.

Block 310 of the method 300 includes receiving, by the controller 108, the travel speed measured by the speed sensor 102.

Block 320 of the method 300 includes determining by the controller 108 whether the travel speed is less than a speed threshold. If yes, the method proceeds to block 325. If no, the method returns to block 310.

In block 325, the method includes determining if the alert-only mode has been selected. If the alert-only mode has been selected, the process proceeds to block 340, otherwise the process proceeds to block 330 (control mode).

In block 330, the method 300 includes limiting the turning speed of the compactor 200. In one embodiment, the controller 108 may limit the turning speed (movement) of the compactor 200 by activating (via the steering control valve 212) a fixed (constant) turning speed of the compactor 200 for travel speeds of the compactor 200 that are below a speed threshold. In another embodiment, the controller 108 may allow a range of turning speeds (for travel speeds below the speed threshold) but may cap the range (via the steering control valve 212) with a maximum turning speed cap. In yet another embodiment, the controller 108 may activate (via the steering control valve 212) a variable turning speed that is calculated or determined by the controller 108 (for example, from a look up table or the like stored in the memory component 112) based on the measured travel speed of the compactor 200. In some embodiments, the controller 108 may also activate an alert. Activation of the alert may include one or more of the following: activating the alarm member 107 to emit a light (flashing or otherwise) or audible alarm, or generating a warning message and displaying the warning message on the display 106.

In block 340, the method 300 includes activating, by the controller 108, an alert. Activation of the alert may include one or more of the following: activating the alarm member 107 to emit a light (flashing or otherwise) or audible alarm, or generating a warning message and displaying the warning message on the display 106.

In block 350, the method 300 includes determining if the steering speed of the steering member 214 exceeds a turning threshold within a time period T, for example within a range of zero to three minutes, after the activation of the alert. The turning threshold is a rate of movement of the steering member 214 that would result in a certain turning speed of the rollers 208 of the compactor 200. Any appropriate time period T may be used. In one embodiment, the turning threshold may be a fixed (constant) speed. In another embodiment, the turning threshold may be a variable turning speed that is calculated or determined by the controller 108 (for example, from a look up table or the like stored in the memory component 112) based on the measured travel speed of the compactor 200. If the steering speed of the steering member 214 exceeds the turning threshold within a time period T, the method 300 proceeds to block 360.

In block 360, the controller 108 logs in the memory component 112 each incidence in which the steering speed of the steering member 214 exceeds the turning threshold within the time period T after generation of the alert. In one embodiment, the time, date, steering speed, and the turning threshold are logged in the memory component 112. Such information may be later retrieved and reported out.

Figure 4:
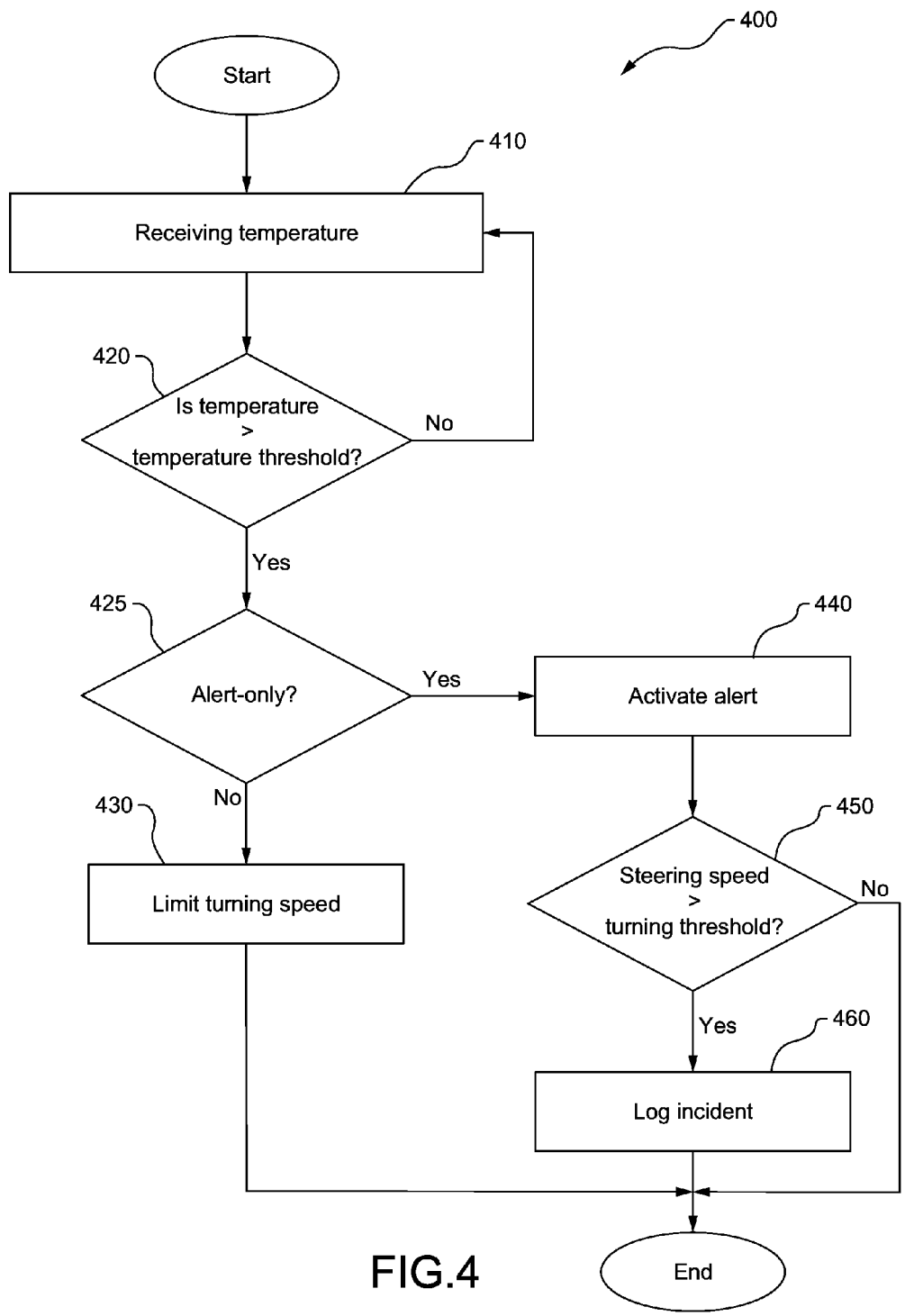
FIG. 4 is a flowchart illustrating exemplary blocks of an alternative method of limiting the turning speed of the compactor.

Referring now to FIG. 4, an exemplary flowchart is illustrated showing sample blocks which may be followed in an alternative method of limiting the turning speed of the compactor 200. The method 400 may be practiced with more or less than the number of blocks shown.

Block 410 of the method 400 includes receiving, by the controller 108, the temperature of the surface 210 from the temperature sensor 104.

Block 420 of the method 400 includes determining by the controller 108 whether the temperature is greater than a temperature threshold. If yes, the method 400 proceeds to block 425. If no, the method 400 returns to block 410.

In block 425, the method 400 includes determining if the alert-only mode has been selected. If alert-only mode has been selected, the process proceeds to block 440, otherwise the process proceeds to block 430 (control mode).

In block 430, the method 400 includes limiting the turning speed of the compactor 200. This may be accomplished, by the controller 108, via control of the steering control valve 212 (to limit the turning speed of the compactor 200). In one embodiment, the controller 108 may activate a fixed turning speed of the compactor 200 for each temperature above the temperature threshold. In another embodiment, the controller 108 may allow a range of turning speeds (for temperatures above the temperature threshold) but may cap the range with a maximum turning speed cap. In yet another embodiment, the controller 108 may activate a variable turning speed that is calculated or determined by the controller 108 (for example, from a look up table or the like stored in the memory component 112) based on the measured temperature. In some embodiments, the controller 108 may also activate an alert. Activation of the alert may include one or more of the following: activating the alarm member 107 to emit a light (flashing or otherwise) or audible alarm, or generating a warning message and displaying the warning message on the display 106.

In block 440, the method 400 includes activating, by the controller 108, an alert. Activation of the alert may include one or more of the following: activating the alarm member 107 to emit a light (flashing or otherwise) or audible alarm, or generating a warning message and displaying the warning message on the display 106.

In block 450, the method 400 includes determining if the steering speed of the steering member 214 exceeds a turning threshold within a time period T, for example within a range of zero to three minutes, after the activation of the alert. Any appropriate time period T may be used. In one embodiment, the turning threshold may be a fixed (constant) speed. In another embodiment, the turning threshold may be a variable turning speed that is calculated or determined by the controller 108 (for example, from a look up table or the like stored in the memory component 112) based on the measured temperature. If the steering speed of the steering member 214 exceeds the turning threshold within a time period T, the method 400 proceeds to block 460.

In block 460, the controller 108 logs in the memory component 112 each incidence in which the steering speed of the steering member 214 exceeds the turning threshold within the time period T after generation of the alert. In one embodiment, the time, date, steering speed, and the turning threshold are logged in the memory component 112. Such information may be later retrieved and reported out.

Figure 5:
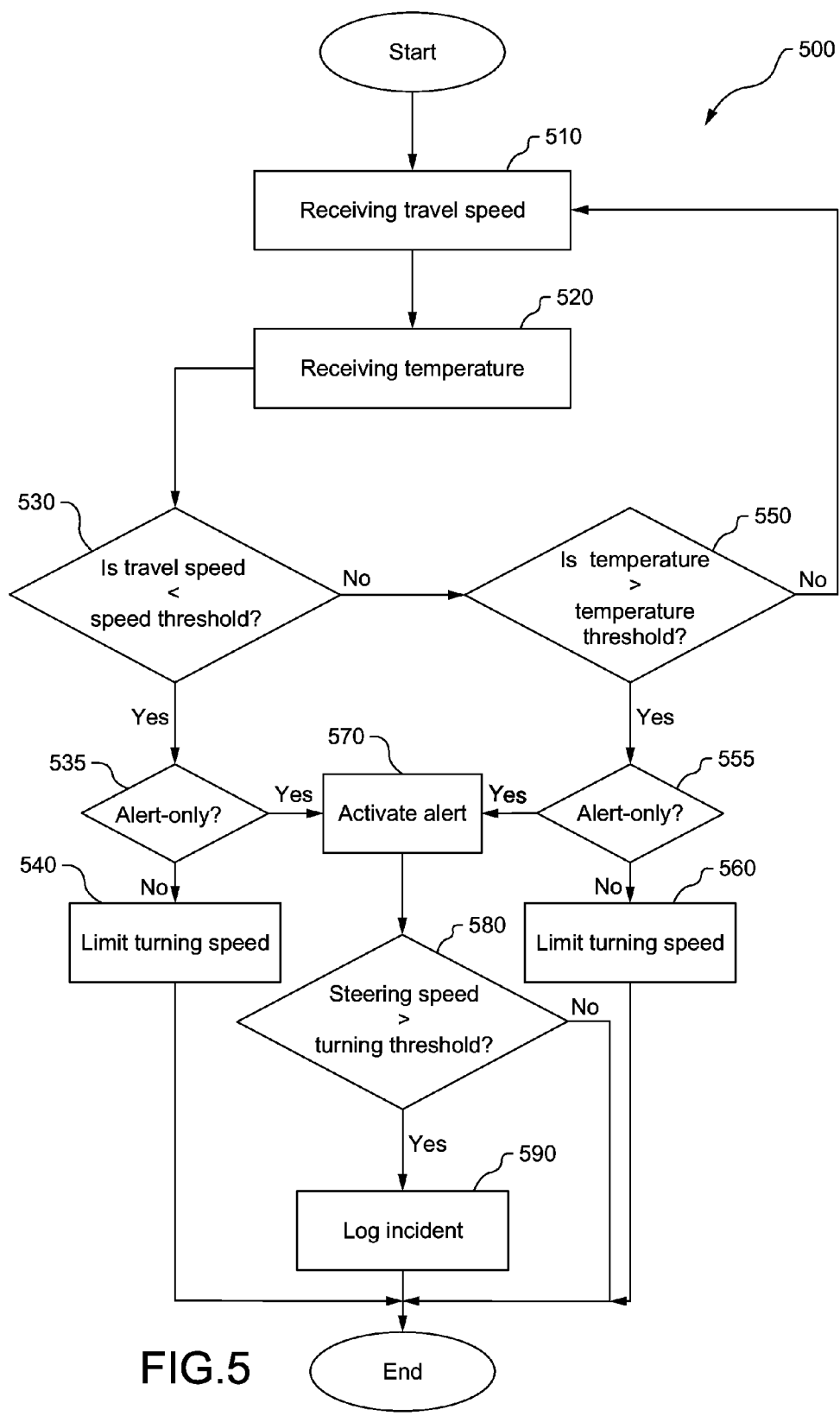
FIG. 5 is a flowchart illustrating exemplary blocks of an alternative method of limiting the turning speed of the compactor.

Referring now to FIG. 5, an exemplary flowchart is illustrated showing sample blocks which may be followed in a method of limiting the turning speed of the compactor 200. The method 500 may be practiced with more or less than the number of blocks shown.

Block 510 of the method 500 includes receiving, by the controller 108, the travel speed from the speed sensor 102.

Block 520 of the method 500 includes receiving the temperature of the surface 210.

Block 530 of the method 500 includes determining by the controller 108 whether the travel speed is less than a speed threshold. If yes, the method 500 proceeds to block 535. If no, the method 500 proceeds to block 550.

In block 535, the method 500 includes determining if the alert-only mode has been selected. If alert-only mode has been selected, the process proceeds to block 570, otherwise the process proceeds to block 540 (control mode).

In block 540, the method 500 includes limiting the turning speed of the compactor 200. This may be accomplished, by the controller 108, via control of the steering control valve 212 (to limit the turning speed of the compactor 200). In one embodiment, the controller 108 may activate a fixed turning speed of the compactor 200 for each travel speed of the compactor 200 below the speed threshold. In another embodiment, the controller 108 may allow a range of turning speeds (for travel speeds below the speed threshold) but may cap the range with a maximum turning speed cap. In yet another embodiment, the controller 108 may determine and activate a variable turning speed that is calculated or determined (for example, from a look up table or the like stored in the memory component 112) based on the measured travel speed. In some embodiments, the controller 108 may also activate an alert. Activation of the alert may include one or more of the following: activating the alarm member 107 to emit a light (flashing or otherwise) or audible alarm, or generating a warning message and displaying the warning message on the display 106.

Block 550 of the method 500 includes determining by the controller 108 whether the temperature of the surface 210 is greater than a temperature threshold. If yes, the method 500 proceeds to block 555. If no, the method 500 returns to block 510.

In block 555, the method 500 includes determining if the alert-only mode has been selected. If alert-only mode has been selected, the process proceeds to block 570, otherwise the process proceeds to block 560 (control mode).

In block 560, the method 500 includes limiting the turning speed of the compactor 200. This may be accomplished, by the controller 108, via control of the steering control valve 212 (to limit the turning speed of the compactor 200). In one embodiment, the controller 108 may activate a fixed turning speed of the compactor 200 for each temperature above the temperature threshold. In another embodiment, the controller 108 may allow a range of turning speeds (for temperatures above the temperature threshold) but may cap the range with a maximum turning speed cap. In yet another embodiment, the controller 108 may determine and activate a variable turning speed that is calculated or determined (for example, from a look up table or the like stored in the memory component 112) based on the measured temperature. In some embodiments, the controller 108 may also activate an alert. Activation of the alert may include one or more of the following: activating the alarm member 107 to emit a light (flashing or otherwise) or audible alarm, or generating a warning message and displaying the warning message on the display 106.

In block 570, the method 500 includes activating, by the controller 108, an alert. Activation of the alert may include one or more of the following: activating the alarm member 107 to emit a light (flashing or otherwise) or audible alarm, or generating a warning message and displaying the warning message on the display 106.

In block 580, the method 500 includes determining if the steering speed of the steering member 214 exceeds the turning threshold within a time period T, for example within a range of zero to three minutes, after the activation of the alert. Any appropriate time period T may be used. In one embodiment, the turning threshold may be a fixed (constant) speed. In another embodiment, the turning threshold may be a variable turning speed that is calculated or determined by the controller 108 (for example, from a look up table or the like stored in the memory component 112) based on either the measured temperature (if the travel speed was determined in block 530 to be less than the speed threshold) or the measured travel speed (if the travel speed was determined to be greater than or equal to the speed threshold in block 530 and the temperature was determined in block 550 to be greater than the temperature threshold). If the steering speed of the steering member 214 exceeds the turning threshold within a time period T, the method 500 proceeds to block 590.

In block 590, the controller 108 logs in the memory component 112 each incidence in which the steering speed of the steering member 214 exceeds the turning threshold within the time period T after generation of the alert. In one embodiment, the time, date, steering speed, and the turning threshold are logged in the memory component 112. Such information may be later retrieved from the memory component 112 and reported out.

Figure 6:
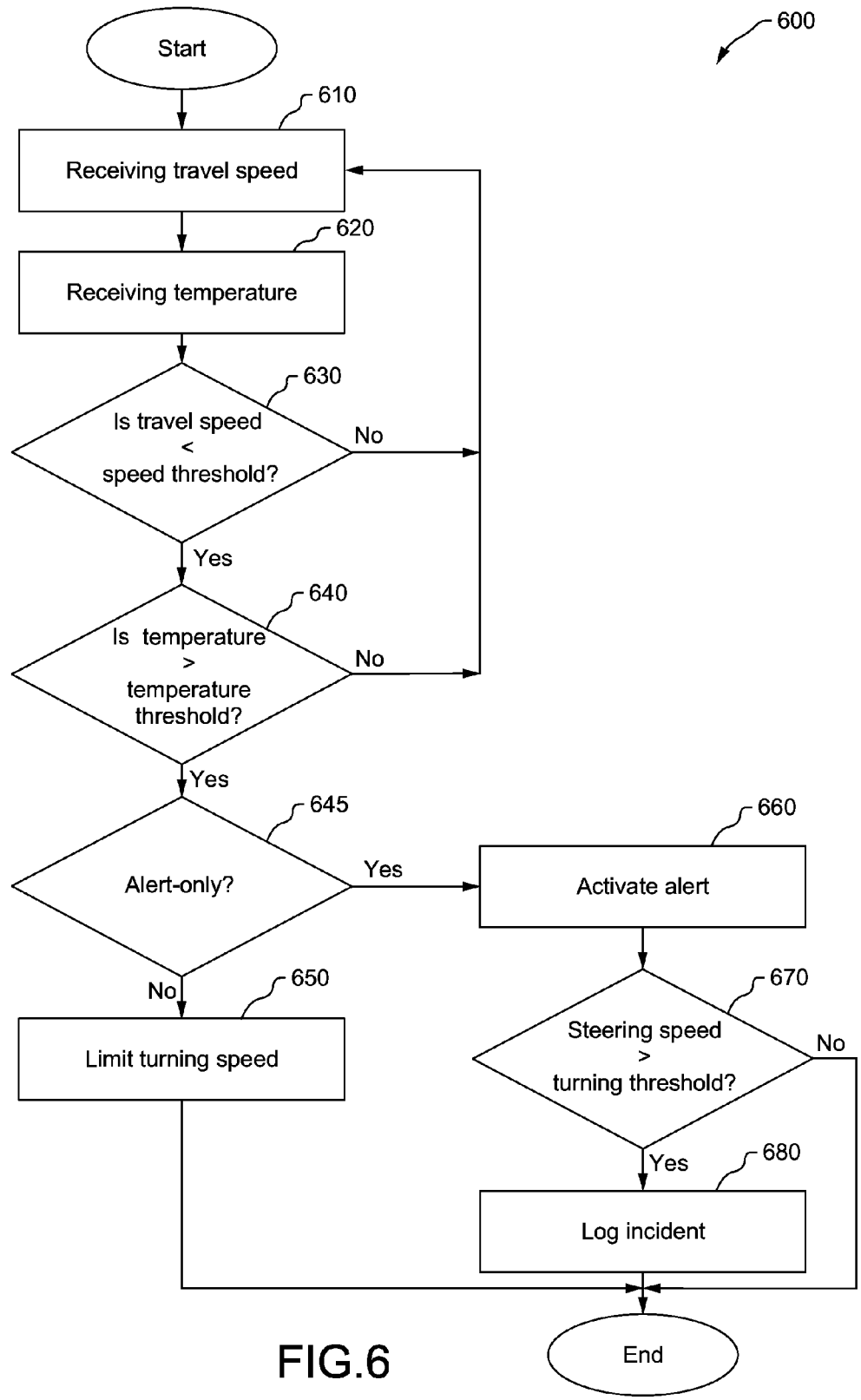
FIG. 6 is a flowchart illustrating exemplary blocks of an alternative method of limiting the turning speed of the compactor.

Referring now to FIG. 6, an exemplary flowchart is illustrated showing sample blocks which may be followed in a method 600 of limiting the turning speed of the compactor 200. The method 600 may be practiced with more or less than the number of blocks shown.

Block 610 of the method 600 includes receiving, by the controller 108, the travel speed from the speed sensor 102.

Block 620 of the method 600 includes receiving, by the controller 108, the temperature of the surface 210 from the temperature sensor 104.

Block 630 of the method 600 includes determining by the controller 108 whether the travel speed is less than a speed threshold. If yes, the method 600 proceeds to block 640. If no, the method 600 proceeds to block 610.

Block 640 of the method 600 includes determining by the controller 108 whether the temperature of the surface 210 is greater than a temperature threshold. If yes, the method 600 proceeds to block 645. If no, the method 600 returns to block 610.

In block 645, the method 600 includes determining if the alert-only mode has been selected. If alert-only mode has been selected, the method 600 proceeds to block 660, otherwise the method 600 proceeds to block 650 (control mode).

In block 650, the method 600 includes limiting the turning speed of the compactor 200. This may be accomplished, by the controller 108, via control of the steering control valve 212 (to limit the turning speed of the compactor 200). In one embodiment, the controller 108 may activate a fixed turning speed of the compactor 200. In another embodiment, the controller 108 may allow a range of turning speeds (for incidences when the travel speed is below the speed threshold and the temperature is above the temperature threshold) but may cap the range with a maximum turning speed cap for the compactor 200. In yet another embodiment, the controller 108 may determine and activate a variable turning speed that is calculated or determined (for example, from a look up table, or the like, stored in the memory component 112) based on both the measured travel speed and the measured temperature. In some embodiments, the controller 108 may also activate an alert. Activation of the alert may include one or more of the following: activating the alarm member 107 to emit a light (flashing or otherwise) or audible alarm, or generating a warning message and displaying the warning message on the display 106.

In block 660, the method 600 includes activating, by the controller 108, an alert. Activation of the alert may include one or more of the following: activating the alarm member 107 to emit a light (flashing or otherwise) or audible alarm, or generating a warning message and displaying the warning message on the display 106.

In block 670, the method 600 includes determining if the steering speed of the steering member 214 exceeds a turning threshold within a time period T, for example within a range of zero to three minutes, after the activation of the alert. Any appropriate time period T may be used. In one embodiment, the turning threshold may be a fixed (constant) speed. In another embodiment, the turning threshold may be a variable turning speed that is calculated or determined by the controller 108 (for example, from a look up table or the like stored in the memory component 112) based on both the measured travel speed and the measured temperature. If the steering speed of the steering member 214 exceeds the turning threshold within a time period T, the method 600 proceeds to block 680.

In block 680, the controller 108 logs in the memory component 112 each incidence in which the steering speed of the steering member 214 exceeds the turning threshold within the time period T after generation of the alert. In one embodiment, the time, date, steering speed, and the turning threshold are logged in the memory component 112. Such information may be later retrieved from the memory component 112 and reported out.

The features disclosed herein may be particularly beneficial for use with compactors 200. The system 100 and methods disclosed herein help prevent tearing of recently paved surfaces 210 by warning the operator when the turning speed is too aggressive for the travel speed of the compactor 200 and/or the temperature of the surface 210. The system 100 and methods disclosed herein further help prevent tearing of surfaces 210 by controlling the turning speed of the steering member 214 of the compactor 200 when certain conditions are met.

What is claimed is:

1. A system on a compactor, the compactor including a steering member, the steering member configured to receive operator steering input, the system comprising:
    a speed sensor mounted on the compactor, the speed sensor configured to measure a travel speed of the compactor over a surface; and
    a controller in communication with the speed sensor, the controller configured to:
        receive the travel speed of the compactor from the speed sensor; and
        limit a turning speed of the compactor when a condition is satisfied,
        wherein the condition is satisfied when the travel speed is less than a speed threshold.

2. The system of claim 1, wherein the turning speed is limited by the controller implementing a fixed turning speed or a maximum turning speed cap.

3. The system of claim 1, wherein the turning speed is limited by the controller implementing a variable turning speed based on the travel speed.

4. The system of claim 1, further including a temperature sensor mounted on the compactor, the temperature sensor in communication with the controller and configured to measure a temperature of the surface, and in which the controller is further configured to
    receive the temperature from the temperature sensor; and
    limit the turning speed of the compactor when the temperature is greater than a temperature threshold.

5. The system of claim 4, wherein the turning speed is limited by the controller implementing a fixed turning speed or a maximum turning speed cap.

6. The system of claim 4, wherein the turning speed is limited by the controller implementing a variable turning speed based on the temperature of the surface.

7. The system of claim 1, further including a temperature sensor mounted on the compactor, the temperature sensor in communication with the controller and configured to measure a temperature of the surface, and in which the controller is further configured to:
    receive the temperature from the temperature sensor,
    wherein the condition is satisfied when the travel speed is less than a speed threshold and the temperature is greater than a temperature threshold,
    wherein further the turning speed is limited by the controller implementing a variable turning speed based on the travel speed and the temperature.

8. A method of limiting a turning speed of a compactor including a steering member, a controller, a speed sensor, and a temperature sensor, the steering member configured to receive operator steering input, the speed sensor mounted on the compactor and in communication with the controller, the speed sensor configured to measure a travel speed of the compactor over a surface, the temperature sensor mounted on the compactor, the temperature sensor in communication with the controller and configured to measure a temperature of the surface, the method comprising:
    receiving, by the controller, the travel speed; and
    limiting the turning speed of the compactor when a condition is satisfied,
    wherein the condition is satisfied when the travel speed is less than a speed threshold.

9. The method of claim 8, wherein the limiting further includes the controller implementing a fixed turning speed.

10. The method of claim 8, wherein the limiting further includes the controller implementing a turning speed based on the travel speed.

11. The method of claim 8, wherein the limiting further includes the controller implementing a maximum turning speed cap.

12. The method of claim 8, further including:
    receiving the temperature of the surface from the temperature sensor; and
    limiting the turning speed of the compactor when the temperature is greater than a temperature threshold.

13. The method of claim 12, wherein the limiting further includes the controller implementing a fixed turning speed.

14. The method of claim 12, wherein the limiting further includes the controller implementing a turning speed based on the temperature.

15. The method of claim 12, wherein the limiting further includes setting a maximum turning speed cap.

16. The method of claim 8, further including:
    receiving the temperature of the surface from the temperature sensor,
    wherein the condition is satisfied when the travel speed is less than a speed threshold and the temperature is greater than a temperature threshold.

17. The method of claim 16, wherein the limiting further includes the controller implementing a fixed turning speed.

18. The method of claim 16, wherein the limiting further includes the controller implementing a variable turning speed based on the travel speed and the temperature.

19. The method of claim 16, wherein the limiting further includes the controller implementing a maximum turning speed cap.

* * * * *